Feb. 26, 1952
C. C. CLOUGH
2,587,031
VEHICLE BOGEY
Filed Oct. 26, 1948
2 SHEETS—SHEET 2
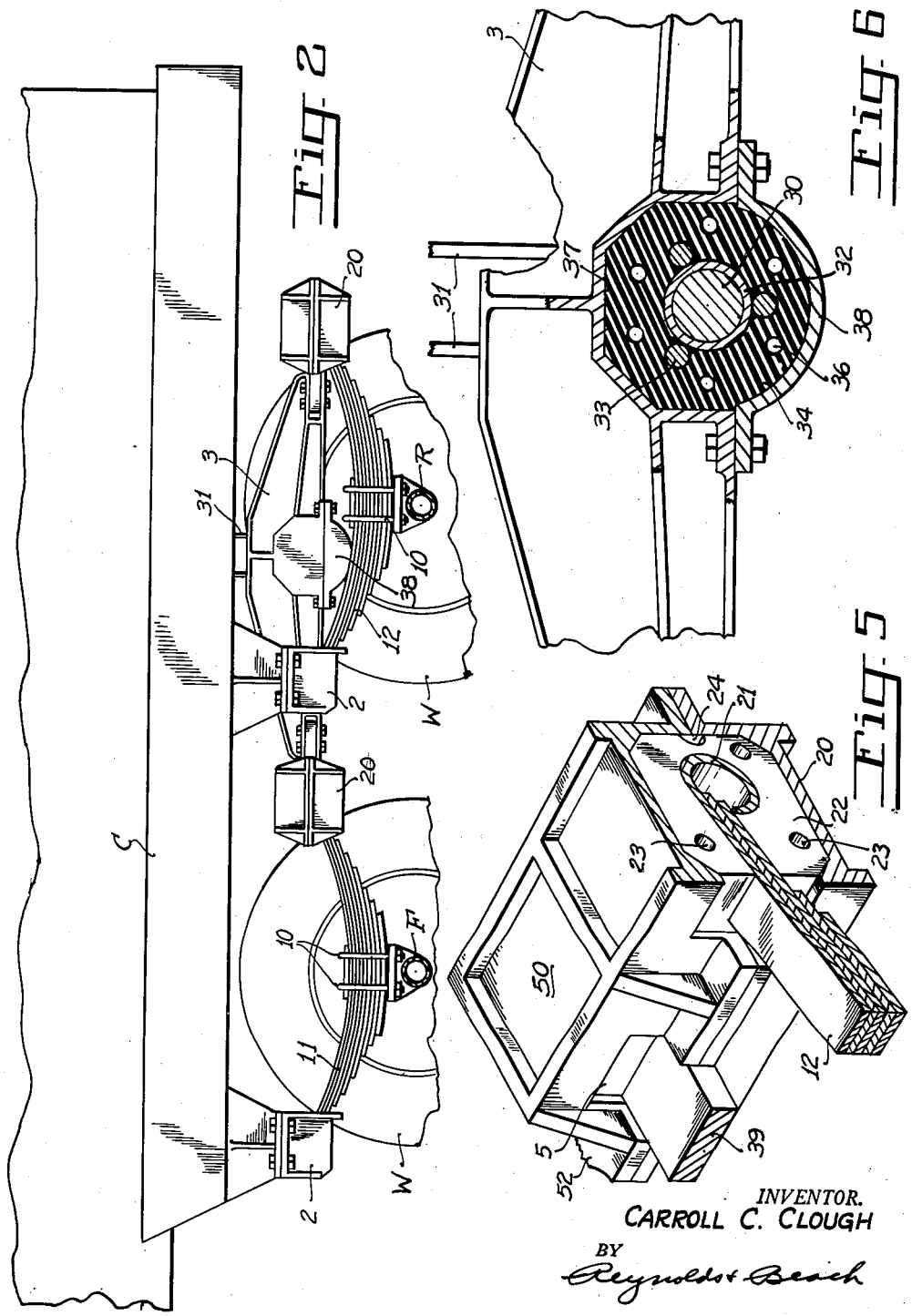
INVENTOR.
CARROLL C. CLOUGH
BY
Reynolds + Beach
ATTORNEYS Patented Feb. 26, 1952

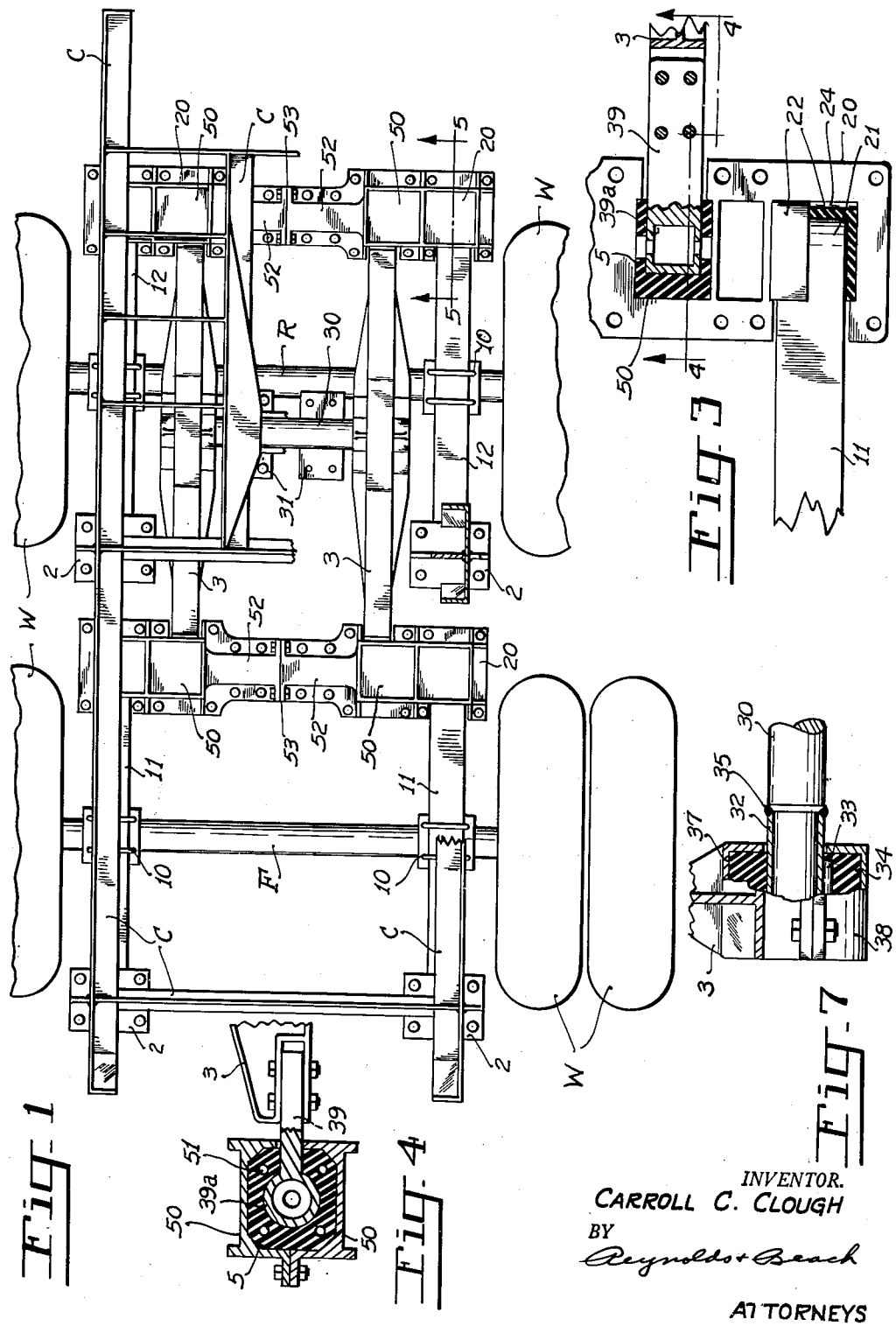

2,587,031

UNITED STATES PATENT OFFICE 2,587,031

VEHICLE BOGEY

Carroll C. Clough, near Seattle, Wash.

Application October 26, 1948, Serial No. 56,637

21 Claims. (Cl. 280—104.5)

The present invention relates to vehicle bogeys, and more particularly to the relationship between two tandem axles and their respective spring mounts, and between the paired spring mounts at each side, and the similar pair of spring mounts at the opposite sides.

In the construction of vehicle bogeys in the past there have been varied proposals for the employment of spring beams for the immediate support of axles, and for the equalization of movement as between two tandem axles through an equalizing or connecting beam joining two such spring beams. Always heretofore such elements have either been more or less rigidly mounted, the equalizing beams to the chassis and the spring beams to the chassis and to the equalizing beam, respectively, or the equalizing beam has been split into two wholly unconnected halves, one at each side. Were such tandem axles to rise and fall simultaneously and by equal amounts at their two ends, such a rigid interconnection would be reasonably satisfactory, but inequalities in roadway surfaces are not commonly so conveniently arranged, and ordinarily one end of an axle will rise or fall to an appreciably greater or lesser degree than the opposite end, and out of phase therewith, and the tilting so occasioned creates severe stresses and wear in the rigid mounts of the system. In addition, and because such bogeys are employed only for vehicles which are designed to carry heavy loads, even the limited rotational or oscillatory movement within the several pivotal mountings creates severe wear, which is aggravated by the tilting stresses referred to above. As an example, semi-trailer tanks mounted upon such a tandem axle bogey require major overhaul and replacement of bushings and the like in a matter of weeks of ordinary service. Not only is such repair expensive in itself, but it has the effect of tying up expensive and needed equipment for appreciable periods, during which time it is not earning the revenue which it should.

Because of the recognized drawbacks to any rigid transverse interconnection of the equalizer-connected ends of the spring beams, whose chassis-connected ends are necessarily rather rigidly cross-connected through the chassis, a proposed solution has been the division of the equalizer beam longitudinally into two wholly unconnected halves. This affords greater flexibility to the bogey parts, but leaves each part to withstand a greater ratio of the various loads to which it is subjected, without cooperation from or distribution of loads to other parts in so doing, to the extent desirable, and at least partially attainable in the rigid interconnection. Another object of this invention is to include the advantages of flexibility as between the two sides without sacrifice of the cooperative effect of all parts in distributing and assuming loads imposed upon any one part, and to do this by an interconnection between the two equalizer beam halves which affords some, but limited, yieldability between them.

In attaining the latter object, a further object of the present invention appears, namely, to provide in such a bogey structure involving tandem axles, not merely spring beams and equalizing beams which afford flexibility between the axles and the chassis in the vertical sense, but mounts used in conjunction with such spring beams and equalizing beams which afford a degree of independence of movement as between the opposite ends of each axle, and particularly of tilting movement in the transverse direction between the spring beams and the equalizing beams and the axles or frame to which each is connected, so that, by assuring flexibility in the transverse direction, with no loss of strength or safety, the flexibility in the longitudinal direction is itself enhanced, and thereby road shocks on the vehicle as a whole are reduced, wear on all parts of the bogey construction is greatly lessened, the necessity for frequent servicing is obviated, and the cost of maintenance, direct and indirect, is reduced to a minimum.

To those ends, and more specifically, by this invention, there are incorporated in a bogey structure employing tandem axles and an interconnecting equalizing beam between the spring beams thereof, flexible torsion-resisting blocks of rubber or rubber composition (hereinafter termed generically "rubber"), which by their relative disposition will withstand and yield to such complex stresses, particularly transverse stresses, yet with minimum distortion of the rubber, and to a high degree will eliminate wear, and yet by their coordinate ability to accommodate twisting or tilting stresses will afford extreme flexibility to the individual pivot points and elements of the bogey, and to the spring beams and equalizing beams thereof, to the ultimate end of improving performance while in use, and of greatly reducing the necessity for and the frequency of repair and replacement. As an example, it has been found that such bogeys as constitute the subject matter of this invention will operate under conditions which in previous mounts require major repairs in a period of weeks, over a period of six or more months, or measured in distance, will operate with substantially no service over mileage approaching one million miles.

It is not contended that the employment of rubber torsion mounts is new, for they have been employed heretofore, but normally their employment has been in mounts so arranged as to produce an unnecessarily high degree of distortion of the rubber, with consequent complications. It is an object of the present invention to provide rubber mounts so incorporated in such flexible and complex bogey structures as to peculiarly improve the operation of the latter to their intended ends, to simplify their form and mounting and lengthen their life, and to lessen wear in the bogey structure as a whole and the necessity for laying it up frequently.

It is a particular object to provide a bogey structure of the nature already indicated, which in certain respects will be reasonably rigid notwithstanding the severe stresses to which it will be subjected, and which in other respects will be sufficiently and more than ordinarily flexible to afford the desired flexibility of action of the individual parts thereof, to the principal ends already indicated.

It is also an object to provide a bogey structure of the nature indicated which shall be mechanically simple, both to construct and to assemble and install, and for convenience of occasional repair or replacement of parts.

With such objects in mind, and others, particularly those which relate to details of construction, as will appear hereinafter, this invention comprises the novel bogey structure and the novel pivotal mount incorporated in the same, and the novel parts and combinations thereof, all as shown in the accompanying drawings, as will be described in this specification, and as will be more particularly pointed out in the appended claims.

In the accompanying drawings the invention is shown incorporated in a typical or representative form, but it is not the intention to restrict the invention solely to this form, other than as is required in the claims.

Figure 1 is a plan view, with parts broken away, and Figure 2 is a side elevation, illustrating the bogey structure as applied to a tank semi-trailer.

Figure 3 is a detail in plan view, with parts removed or broken away, illustrating the interconnection between an end of the connecting or equalizing beam, and an end of a spring beam.

Figure 4 is a sectional view substantially along the line 4—4 of Figure 3.

Figure 5 is a sectional isometric view, the line of section being indicated at 5—5 in Figure 1.

Figure 6 is in part a side elevation and in part a sectional view of the central pivot of the rigid beam.

Figure 7 is in general an axial sectional detail of the central pivot of the equalizing beam.

For the sake of simplicity the invention is shown embodied in a semi-trailer bogey, wherein the axles are dead axles, that is, they are not powered. However, the same principles of suspension and mounting may be incorporated where the axles are driven, hence it is not intended to restrict the invention in this respect to employment solely with dead axles.

For convenience of reference one of the axles F may be considered the forward axle, and the axle R the rear axle. Upon the ends of these respective axles, outside the chassis C, are mounted the respective road wheels W. The end of each axle is mounted upon a longitudinally directed beam, which by preference is a leaf spring beam, and while these two beams at each side are, or may be, identical, they are designated, to distinguish them, the forward spring beam 11, and the rear spring beam 12. It will be understood that these spring beams will be duplicated at opposite sides of the vehicle, that is, each end of each axle will be mounted by such an independently flexible and independently bodily movable spring beam. The particular style and manner of connection of the beam may vary, but as herein shown, each spring beam is rigidly connected to its axle, intermediate the ends of the spring beam, by conventional means, indicated at 10, and the beam's ends extend forwardly and rearwardly from the axle so supported. The principles of the invention are not departed from, however, if the spring beam extends only in one sense, as forwardly, from the axle.

One end of each spring beam, preferably the forward end, is mounted to the chassis by a mount generally indicated by the numeral 2. At a point distant from this mount 2, usually at its rear end, each spring beam is mounted by a mount generally indicated by the numeral 20, to an end of an equalizing or connecting beam, generally indicated by the numeral 3. This latter beam is preferably but not necessarily rigid in the longitudinal direction, and is pivotally or rockably mounted at or near its mid-point, in a manner to be described in detail hereinafter, to the chassis C. Its forward end, in the arrangement shown, supports the rear end of the forward spring beam 11, while its rear end supports the rear end of the rear spring beam 12.

Preferably the rigid beam 3 is formed in two halves, rights and lefts, which, however, are not independent of one another, yet are permitted some relative movement. They are connected together in a somewhat rigid manner, though still in such manner as will permit some rocking movement of each relative to or out of exact phase with the other. One half may lie closely adjacent the left-hand spring beams 11 and 12, and the other half may lie closely adjacent the corresponding right-hand spring beams, so that the longitudinally rigid beam as a whole is interposed between the opposite pairs of spring beams. Each half is pivotable about a pivot shaft 30, which is securely clamped and immovably held to the chassis by means such as the brackets 31, and upon its respective reduced ends are fitted sleeves 32, having exteriorly projecting axially directed ribs 33, which serve to transmit torsional stresses to and from a surrounding rubber block 34. The rubber block 34 and the sleeve 32 may be previously assembled and vulcanized or bonded together, and then the sleeve may be mounted upon the reduced end of the shaft 30, and secured in place by welding, as indicated at 35 (see Figure 7). The rubber block 34 may be molded upon the sleeve 32 and its ribs 33, and may be apertured at 36 to afford increased torsional and radial yieldability. Such rubber block is noncircular in cross-section and its exterior is of a shape complemental to the recess 37 within the beam 3, but the block is somewhat over-size so that it is compressed and rigidly held in such beam recess by the securement of the cap 38 on the beam to close the recess. Thus is formed a rubber mount which permits a limited amount of rocking of the beam half 3 in a longitudinal vertical plane, and quite limited relative vertical movement as between the beam 3 and the chassis. By providing two such mounts, one adjacent each side of the chassis, the beam 3 as a whole has some limited ability to tilt transversely, but in addition may rock with sufficient freedom, both as a whole and relative to the chassis, and each half relative to the other half, to equalize as between the ends of the respective springs 11 and 12 to which its ends are connected, and between the opposite ends of each axle. It serves also to absorb certain vertical shock loads.

It will be helpful to emphasize at this point that the ends of the two rigid beams 3 while interconnected are not rigidly connected together, and have some limited and resilient relative rockability in vertical longitudinal planes, in connection with the greater relative rockability of the spring beams at the opposite sides of the chassis. The structure which permits this will be described more fully hereinafter.

In contrast to the limited ability of the two-part beam 3 to tilt transversely, the axles F and R should have very appreciable ability to tilt transversely, and each independently of the other, and yet at all times their movements should be equalized both as to the two beams 11 and the two beams 12 at opposite sides of the chassis, and as to the pairs of spring beams 11 and 12 along the common sides of the chassis. Additionally each such spring beam must connect rather directly to the chassis, in order to receive therefrom and absorb the stresses occasioned by road inequalities or road shocks, and for traction.

Each mount at 2, for what have been selected as the forward ends of the spring beams 11 and 12, consists of a housing, which in all essential respects is similar to that which receives the rear ends of the same spring beams, and a description of the latter will suffice to make clear the construction and arrangement of the mount at 2. The end of the spring beam is curled, as indicated at 21 in Figure 5, and sufficient of the leaves of the spring beam enter the housing 20 and the curled end 21 as are required for adequate strength and support. This rounded end 21 is received between two half-blocks of rubber, designated 22, the separation between which is along a longitudinal vertical median plane of the spring beam. These half-blocks slip on to the rounded end 21 from opposite sides thereof, and the complete block is then received between the upper and lower halves of the housing 20, and compressed therein. Being noncircular, the block 22 may not rotate with respect to the housing, nor, by reason of the projection of the spring beam end, may it rotate with respect to the spring beam. It is relieved at 23 to afford somewhat greater torsional yieldability, and it is also relieved by a groove 24 for longitudinal extension of the springs, for as the slightly bowed spring beam is the more highly loaded its ends tend to separate, and the groove at 24 affords room for movement of the rubber to accommodate this extension in length of the spring beams, particularly as the amount of such extension is minimized by the geometrical arrangement of the several pivotal mounts which is hereinafter made clear.

By the arrangement described it is clear that each end of each spring beam may rotate to an adequate degree about the pivot axis defined by the curled end 21, that the rubber block 22 will absorb to an appreciable degree vertical shocks or loads, and that longitudinal extension or contraction of the length of the spring beam is accommodated within the rubber blocks 22. Moreover, by the employment of split blocks, as described, the assembly or disassembly of the mount is greatly facilitated.

The housings 20, as has already been indicated, may be considered as a part of the equalizing beams 3, but are not rigidly connected thereto. Each end of these beams is received within a housing 50, which also is a part of the equalizing beam, but connected somewhat flexibly to such beam proper. Each beam at its end receives a rigidly held extension 39, which at its end is circularly formed, as indicated at 39a (see Figure 4), and this rounded end 39a is received within and vulcanized or bonded to a rubber block 5 which is compressed within the two-part housing 50. Like the other rubber blocks, it, too, is relieved, as indicated at 51, for greater torsional yieldability, and for some yieldability to vertical loads.

The paired and transversely offset housings 20 and 50 at one side of the structure are rigidly connected to the similarly paired and offset housings at the opposite side by inward extensions 52 formed, for convenience, of two parts secured together at their mid-point as indicated at 53 in Figure 1. These extensions 52 and their housings 50 and 20 constitute a transverse rigid bar. To this degree the housings 20 and 50 at the two sides, and their integral extensions 52, also constitute a part of the rigid beam 3, but one of the halves of the beam 3 may tilt relative to or out of phase with the other half, by reason of the rubber mount at 5 at each side thereof. Thus while the rigid beam 3 as a while is so mounted to its pivot at 30 that there is but little transverse tiltability, its ends may nevertheless assume the one an elevated and the other a depressed position with respect to the corresponding end of the beam at the opposite side of the structure, by reason of the flexibility imparted by the use of the blocks 5 and 34. At the same time, and by reason of such tilting, the plane of each spring beam may incline sidewise, each end thereof yielding in the rubber blocks 22.

It will be clear that at times the wheels on a given axle, for instance the forward axle F, will tend to rise at one side and perhaps to be depressed simultaneously at the opposite side, creating tilting in this axle F. The same is true of the axle R, of course. The forces which create such movement may at the same time create a tendency to rise or drop as a whole. Complex stresses are created thereby, and the spring beams 11 may as a whole be tilted laterally, and were the pivotal mounts rigid this would create very appreciable wear, and a tendency to breakage, which would have to be resisted by extremely strong structure which in turn would restrict the flexibility of the spring suspension as a whole. However, by reason of the rubber mounts at 22 at both ends of the spring beams, which will yield by tilting laterally, and by reason of the flexible mounts at 5, all such complex stresses may be absorbed, relieved, and distributed, without undue rocking of the structure, and without the probability of breakage, even though the structure may be made materially lighter than if it were all rigidly interconnected. Since there are no relatively movable metal bearing parts, all such wear, and the necessity for lubrication and care, is eliminated.

It will be observed from Figure 2 that each pivot axis 2, 20, 2, 20, and 30 lies in a common, generally horizontal plane. Particularly is it desirable that the axis 30 lie in this plane, for in such case the upward or downward movements of the ends 39a produce the minimum of longitudinal displacement on account of the arc of swing—much less than if the axis 30 were well above the plane of the other such axes. All such longitudinal displacement is in a single sense in each block 5, and the relieving apertures 51, and 24 in the blocks 22, are located to afford the required amount of displacement in such sense, yet with a minimum of distortion of the rubber. Such arrangement is particularly desirable when rubber mounts are used throughout, as otherwise the shear stresses in the rubber can completely destroy the unity of and hence the support afforded by the rubber blocks.

I claim as my invention:

1. In combination with a vehicle chassis, two tandem axles, four spring beams, one supporting each end of each of said axles, two rigid beams, one at each side of the chassis, and each pivotally mounted between its ends upon the chassis, rubber torsion blocks pivotally interconnecting one end of each spring beam to the chassis, and the respectively opposite ends of each rigid beam to points on the respective spring beams, at the corresponding side of the chassis, which are distant from the spring beams' chassis-mounted ends, the several rubber torsion blocks having their effective pivot axes, and the pivot axis of the rigid beam on the chassis lying, all in a common generally horizontal plane, and means interconnecting the opposite rigid beams for conjoint but limited relative tilting about their respective pivotal mounts upon the chassis.

2. In combination with a vehicle chassis, two tandem axles, a spring beam which between its ends is connected to and which extends forwardly and rearwardly from each end of each axle, rocking mounts for one end of each spring beam fixed upon the chassis, a longitudinally extending connecting beam which is rockingly mounted between its ends upon the chassis, at each side thereof, a mount rockingly interengaging the remaining end of each spring beam with the respectively opposite ends of said connecting beam, all said mounts of the beams being disposed with their rocking axes substantially in parallelism, and in a common, generally horizontal line and a cross-connection between corresponding ends of the two connecting beams at opposite sides of the chassis, including means affording limited transverse yieldability as between such corresponding ends.

3. The combination of claim 2, wherein each rocking mount comprises a housing, a pivot element, and a rubber block fixedly held to each of the latter, and relieved for torsional flexure, the rubber blocks mounting the ends of the spring beams being also relieved for limited compression in a longitudinal sense.

4. In combination with a vehicle chassis, two transverse axles in tandem relationship, a spring beam which is connected between its ends to and which extends forwardly and rearwardly from and at each end of each axle, a mount fixed upon the chassis in position to engage one end of each spring beam, for rocking about a transverse axis, a longitudinally extending rigid beam, formed in two halves, operatively interposed between the two spring beams at one side of the chassis and the two at the opposite side, yieldable means interconnecting the two halves of the rigid beam for limited relative movement, a mount upon the chassis supporting each rigid beam half between its ends for rocking about a transverse axis, and mounts between the remaining ends of the spring beams and the respective opposite ends of the rigid beam, for rocking about a transverse axis, and for limited tilting of each axle.

5. The combination of claim 4, wherein the interconnecting means between the two halves of the rigid beam extend across between and are connected to each of the corresponding ends of said rigid beam, and include the yieldable means which afford limited relative movement.

6. The combination of claim 4, wherein the several mounts, and the yieldable interconnecting means between the two halves of the rigid beam are formed and arranged for limited sidewise tilting of the several longitudinally directed elements relative to the chassis and each other, in addition to their pivotal movement about transverse axes.

7. The combination of claim 4, wherein the mounts at the ends of all spring beams comprise rubber blocks fixedly held to the spring beam ends and to the mounts upon the rigid beam and the chassis, respectively, and relieved for torsional deflection, and also yieldable for longitudinal extension of the spring beams and for transverse tilting of each axle and its spring beam.

8. In combination with a vehicle chassis, two parallel transverse axles arranged in tandem relationship, a longitudinally extending spring beam supporting each end of each axle substantially at the mid-point of such spring beam, a housing on the chassis receiving the corresponding end of each spring beam, a rubber torsion block fixedly held within each such housing and about each such spring beam end, a rigid beam pivotally mounted upon the chassis adjacent the beam's mid-point, with its ends adjacent each other end of the respective spring beams, a housing carried at each side of each end of said rigid beam, wherein the corresponding end of the respective spring beams is received, and a rubber torsion block fixedly held in each such housing and about each such spring beam end.

9. The combination of claim 8, including an additional housing adjacent each of the last-mentioned housings wherein the corresponding ends of the rigid beam are received, and a rubber block fixedly held within each such additional housing and about each such rigid beam end.

10. The combination of claim 9, wherein the two additional housings, one at each side, at each end of the rigid beam, are rigidly connected together.

11. The combination of claim 8, including a central housing formed about the pivot axis of each rigid beam, a pivot shaft secured fixedly to the chassis and received within said central housing, and a rubber torsion block fixedly held to said central housing and to said pivot shaft.

12. The combination of claim 8, wherein each of the pivot axes defined by the four torsion blocks along each side, and the axis of the pivotal mounting of the rigid beam, lie all in parallelism in a common, generally horizontally plane.

13. The combination of claim 12, wherein certain of said torsion blocks are transversely apertured in the common plane, beyond the ends of the spring beams, to accommodate longitudinal extension of the latter due to their flexure.

14. In combination with a vehicle chassis, two axles in tandem relationship, two rigid beams, each tiltable from the chassis about an axis common to the two beams and located between its ends, in longitudinal vertical planes, one at each side of the chassis, two spring beams at each side, secured to the ends of the respective axles, and projecting forwardly and rearwardly therefrom, and each pivotably connected by one end to the chassis, a transverse rigid member having four transversely spaced housings, two at each end, located at each end of the rigid beams, the corresponding ends of the two rigid beams being received in two such housings, and the two other ends of the spring beams being received in the other two such housings, and rubber blocks received in all such housings, and incorporated in the pivotable connection between each spring beam and the chassis, to accommodate torsional, compressional, longitudinal, and lateral tilting forces tending to displace the axles and the two rigid beams relative to one another.

15. The combination of claim 14, wherein all the pivotable mountings, and the pivot axis of the rigid beams, lie generally in a common, horizontal plane.

16. The combination of claim 14, wherein the two rigid beams are tiltable about a transverse rock shaft secured to the chassis, and include housings surrounding and spaced from said rock shaft, and rubber blocks in said housings supporting the two rigid beams for torsional, compressional, and lateral tilting movement, each relative to the other, within the limits permitted by the transverse rigid members interconnecting their corresponding ends.

17. The combination of claim 16, wherein all the pivotable mountings, including that of each rigid beam, lie generally in a common, horizontal plane.

18. In a vehicle, in combination with a frame and with tandem axles, a bogey supporting said frame from said axles and comprising: two transverse bars and two spaced-apart longitudinal beams all arranged in a generally rectangular pattern, rubber blocks supportingly interconnecting said bars and beams at the respective corners, for movement of each bar and of each beam in its own vertical plane relative to the other so-connected elements, and for consequent vertical movement so transmitted to such other elements, four additional longitudinally directed beams, two at each side spaced longitudinally, and each pivotally mounted at one end to the frame, and, distant therefrom, secured to an axle, rubber blocks pivotally mounting the two other ends thereof, at each side, to the respective transverse bars, alongside the rubber blocks which interconnect the first two longitudinal beams and the transverse bars, for rocking about each of transverse and longitudinal axes, and a common pivotal mounting intermediate the ends of said first two longitudinal beams, upon the frame, certain of said six longitudinal beams being spring beams.

19. In a vehicle, in combination with a frame and with tandem axles; two rigid bars directed transversely and spaced longitudinally, an equalizer beam half at each side of the frame, directed longitudinally between and pivotally connected to the corresponding ends of the respective transverse bars, and each pivotally mounted intermediate its ends to the frame, two longitudinally extending and longitudinally spaced spring beams at each side of the frame, each disposed with an end adjacent an end of the respective transverse bars, and pivotally mounted therein, offset laterally from the pivotal mounting of the equalizer beam to the same transverse bar, the other end of each spring beam being pivotally mounted upon the frame, and rubber blocks interposed between and affording support for and relative pivotal movement between the pivotally connected elements at each pivotal mounting.

20. In combination with a vehicle frame, two tandem axles, a spring beam secured between its ends to and extending forwardly and rearwardly from each end of each axle, the two spring beams at each side being generally in alignment, a longitudinally extending connecting beam at each side, each pivotally mounted between its ends upon the frame to tilt in generally vertical planes about a common transverse axis, and laterally offset from the corresponding spring beams at the same side, with its ends disposed alongside like ends of the two such corresponding spring beams, transversely extending means pivotally and supportingly interconnecting each such end of the connecting beams with the adjacent end of the corresponding spring beam, for tilting about a transverse axis, means pivotally mounting the opposite end of each spring beam upon the frame for tilting about a transverse axis, and each such pivotal mounting means for the spring beam ends being arranged for limited rocking transversely, to afford limited tilting of one end of each such axle relative to its other end.

21. The combination of claim 20, including means interconnecting the respective ends of the connecting beams, and the thereto-connected ends of the spring beams, for transmission of stresses from a spring beam at one side to the corresponding spring beam at the opposite side.

CARROLL C. CLOUGH.

REFERENCES CITED

The following references are of record in the file of this patent:

UNITED STATES PATENTS

| Number | Name | Date |
|---|---|---|
| 1,928,860 | Marcum | Oct. 3, 1933 |
| 2,065,924 | Knox | Dec. 29, 1936 |
| 2,237,575 | Quartullo | Apr. 8, 1941 |
| 2,251,360 | Knox | Aug. 5, 1941 |
| 2,424,141 | Black | July 15, 1947 |